US012546260B2

(12) United States Patent
Kelly et al.

(10) Patent No.: US 12,546,260 B2
(45) Date of Patent: Feb. 10, 2026

(54) PNEUMATIC START SYSTEM WITH INTEGRATED ELECTRIC GENERATOR POWERED BY ENGINE ENVIRONMENTAL CONTROL BLEED SUPPLY

(71) Applicant: Hamilton Sundstrand Corporation, Charlotte, NC (US)

(72) Inventors: Myles Kelly, Williamantic, CT (US); August Metzler, Manchesney Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/659,775

(22) Filed: May 9, 2024

(65) Prior Publication Data

US 2025/0347253 A1  Nov. 13, 2025

(51) Int. Cl.
*F02C 7/277* (2006.01)
*B64D 13/06* (2006.01)

(52) U.S. Cl.
CPC ...... *F02C 7/277* (2013.01); *B64D 2013/0618* (2013.01); *F05D 2260/85* (2013.01)

(58) Field of Classification Search
CPC .. F01D 25/10; F02C 7/27; F02C 7/277; F02C 7/36; F02C 7/32; B64D 2013/0644; B64D 2013/0648
See application file for complete search history.

(56) References Cited

U.S. PATENT DOCUMENTS

| | | | |
|---|---|---|---|
| 6,305,156 B1 * | 10/2001 | Lui | F02C 6/08 60/788 |
| 10,598,047 B2 | 3/2020 | Clauson et al. | |
| 10,711,700 B2 | 7/2020 | Greenberg et al. | |
| 10,801,371 B2 * | 10/2020 | Clauson | F01D 21/00 |
| 10,823,079 B2 | 11/2020 | Maalouf et al. | |
| 11,078,838 B2 | 8/2021 | Bemment et al. | |
| 11,473,497 B2 * | 10/2022 | Schwarz | F02C 9/18 |
| 11,713,719 B2 | 8/2023 | Mackin et al. | |
| 2004/0211166 A1 * | 10/2004 | Albero | F02K 3/06 60/39.15 |
| 2009/0314002 A1 * | 12/2009 | Libera | F02C 7/277 60/778 |
| 2010/0314877 A1 * | 12/2010 | Finney | F01D 15/10 60/785 |

(Continued)

*Primary Examiner* — Thuyhang N Nguyen
(74) *Attorney, Agent, or Firm* — Kinney & Lange, P.A.

(57) ABSTRACT

A pneumatic start system includes a compressor system and an air turbine starter (ATS) comprising an integrated electric generator. Bleed air from the compressor system flows to the air turbine starter, exciting the integrated generator. The ATS regulates a pressure of the bleed air from the compressor system via the integrated generator. The ATS is fluidly coupled to an environmental control system (ECS) bleed system. A fluid connection between the ECS bleed system and the ATS is regulated by a starter air valve (SAV). A second connection between the ECS bleed system and the ATS is regulated by an ECS shut off valve. Pressure regulated fluid flow from the compressor system is delivered to the ECS bleed system via the second fluid connection or is delivered to ambient atmosphere, via a valve fluidly connected between the ATS and the ambient atmosphere, based upon operation of the ECS shut off valve.

19 Claims, 4 Drawing Sheets

(56) References Cited

U.S. PATENT DOCUMENTS

| | | | |
|---|---|---|---|
| 2013/0247539 A1* | 9/2013 | Hoppe | F02C 7/32 |
| | | | 60/39.15 |
| 2017/0234235 A1* | 8/2017 | Pech | F02C 7/36 |
| | | | 290/31 |
| 2018/0057173 A1* | 3/2018 | Sautron | B64D 13/06 |
| 2019/0219021 A1 | 7/2019 | Pech et al. | |
| 2020/0180772 A1* | 6/2020 | Richardson | B64D 13/08 |
| 2020/0391870 A1* | 12/2020 | Bruno | B64D 13/08 |

* cited by examiner

PNEUMATIC START SYSTEM WITH INTEGRATED ELECTRIC GENERATOR POWERED BY ENGINE ENVIRONMENTAL CONTROL BLEED SUPPLY

BACKGROUND

Pneumatic aircraft engine start systems typically utilize an air turbine starter (ATS) to engage with and spool up (i.e. increase the rotational speed of) an air turbine engine until the air turbine engine reaches light off speed. When the air turbine engine reaches light off speed, combustion occurs and the air turbine engine is operational. When the air turbine engine is operational, the ATS can disengage from the air turbine engine and spool down. Upon spooling down (i.e., reducing rotor rotational speed), the ATS commonly remains dormant for the duration of the flight. Thus, a system for utilizing the otherwise dormant ATS is desirable.

SUMMARY

A pneumatic start system with an integrated electric generator includes a compressor system comprising a high pressure compressor and a low pressure compressor. The system further includes an air turbine starter (ATS) fluidly coupled to the compressor system, fluidly coupled to ambient atmosphere, and fluidly coupled to an environmental control system (ECS) bleed system. The ATS comprising the integrated generator. Bleed air from the compressor system flows through an inlet of the air turbine starter, thereby exciting the integrated generator. The ATS is configured to regulate a pressure of bleed air from the compressor system via operation of the integrated generator. A first fluid connection between the ECS bleed system and the ATS is regulated by a starter air valve (SAV). A second fluid connection between the ECS bleed system and the ATS is regulated by an ECS shut off valve. Pressure regulated fluid flow from the compressor system is delivered to the ECS bleed system via the second fluid connection between the ECS bleed system and the ATS or is delivered to ambient atmosphere, via a valve fluidly connected between the ATS and the ambient atmosphere, based upon operation of the ECS shut off valve.

A method of operating a pneumatic start system of an aircraft with an integrated electric generator, wherein the pneumatic start system comprises a compressor system and an air turbine starter (ATS) fluidly coupled to the compressor system, fluidly coupled to ambient atmosphere, and fluidly coupled to an environmental control system (ECS) bleed system, the method comprising includes directing air from an airframe of the aircraft to an air turbine starter (ATS) via a starter air valve (SAV). The method further includes starting, via the ATS, an aircraft engine by translating pneumatic power received from the airframe to mechanical power, and delivering the mechanical power to the aircraft engine. The method further includes directing bleed air from the compressor system of the aircraft engine to the ATS, wherein the bleed air excites the integrated generator. The method further includes regulating a pressure of the bleed air via the integrated generator within the ATS. The method further includes directing pressure regulated air from the ATS to an ECS bleed system through an ECS shut off valve or from the ATS to ambient atmosphere based upon operation of the ECS shut off valve.

DETAILED DESCRIPTION

The techniques of this disclosure relate to a system for adding electric generator functionality to a pneumatic start system air turbine starter (ATS). To generate power, the electric generator is driven by the turbine as the pressure of bleed air from a high pressure compressor or a low pressure compressor applies force to the turbine blades. The ATS begins operation by receiving air from the airframe of an aircraft via a starter air valve (SAV). The ATS converts pneumatic energy to mechanical shaft power to spool up the engine (i.e., increase the rotational speed of rotors within the high pressure compressor) via a clutch, which drives the output shaft to the engine gearbox (GBX). After engine light off is achieved, via combustion within a combustor section of the aircraft turbine, the SAV is closed. In prior art systems, the ATS would then spool down and be dormant for the duration of flight, while a pressure regulating shutoff valve (PRSOV) valve would be used to regulate the ECS bleed system. In the present system, bleed air is routed to the ATS to support operation of the electric generator, and the work performed on the ATS turbine replaces the function of the PRSOV valve, thereby allowing for removal of the PRSOV valve from the ECS bleed architecture. The system is beneficial as it uses a system that would otherwise be dormant to generate additional generator power, thereby improving net weight, space and cost efficiency of the start system.

Figure 1:
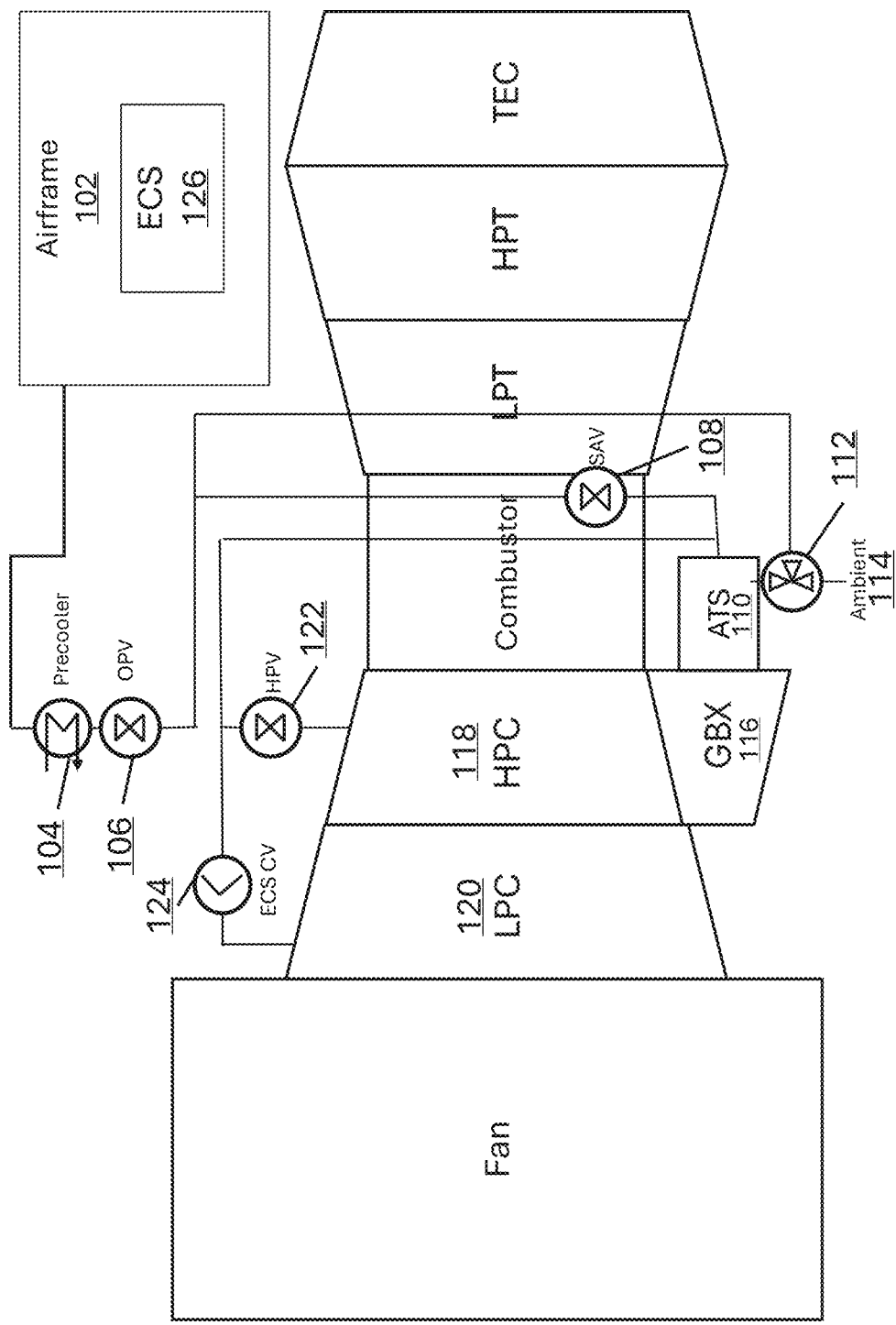
FIG. 1 is a schematic view of a pneumatic start system with an integrated electric generator.

FIG. 1 is a schematic view of a pneumatic start system 100 with an integrated electric generator. Pneumatic start system 100 includes airframe 102, precooler 104, over pressure valve 106, starter air valve 108, air turbine starter (ATS) 110, switching valve 112, gearbox 116, high pressure compressor 118, low pressure compressor 120, high pressure valve 122, and low pressure check valve 124. Airframe 102 includes environmental control system 126.

ATS 110 is fluidly connected to environmental control system (ECS) 126 of airframe 102 via a fluid path through switching valve 112, overpressure valve 106 and precooler 104. ATS 110 is also fluidly connected to the airframe 102 via a fluid path through starter air valve 108. ATS 110 is also fluidly connected to ambient atmosphere 114 via switching valve 112. ATS 110 is also fluidly connected to high pressure compressor 118 through high pressure valve 122 and to low pressure compressor 120 through check valve 124. ATS 110 is mechanically coupled to gearbox 116.

In operation, pneumatic start system 100 begins operation upon execution of an aircraft start sequence. Starter air valve 108 is opened and air flows from airframe 102 to ATS 110. Air flowing into ATS 110 flows through turbine rotors of ATS 110, thereby converting pneumatic power of the airflow to mechanical shaft power, via the torque applied to the turbine rotors within ATS 110. Exhaust flowing from ATS 110 during the start sequence can be directed to ambient atmosphere 114 via switching valve 112. ATS 110 then translates the mechanical energy to high pressure compressor 118 via gearbox 116. Gearbox 116 can be clutched to ATS 110 via a mechanical shaft and gear system designed to translate mechanical energy from ATS 110 to high pressure compressor 118. The turbine rotors of high pressure compressor 118 are activated as a result of the mechanical energy from ATS 110. Upon high pressure compressor 118 reaching a light off speed, fuel is supplied (e.g., within a combustor) and sparking is turned on in order to light a connected combustor. The aircraft engine is thereafter operational.

In prior art systems, after the aircraft start sequence, ATS 110 would thereafter remain dormant for the remainder of aircraft operation, until ATS 110 is needed again to start the aircraft. In the present disclosure, however, ATS 110 includes an integrated generator that is operational during the duration of aircraft operation. Further, work performed on the turbine of ATS 110 supports operation of the integrated generator of ATS 110 and hence pressure within pneumatic start system 100 is regulated, thereby replacing a pressure regulating shutoff valve that would otherwise perform such a function. Specifically, pressure of bleed air from high pressure compressor 118 and low pressure compressor 120 is regulated for delivery to ECS 126 of airframe 102. Additional description regarding the architecture and operation of the integrated generator of ATS 110 is provided below in the description of FIG. 3.

In addition to the aircraft start sequence described above, the integrated generator within ATS 110 can also be used to support bowed rotor starting. Bowed rotors can result from compressors, such as high pressure compressor 118 and low pressure compressor 120, having narrow rotor clearances in order to improve engine efficiency. Bowed rotors can result in compressor blades making contact with a compressor case during the aircraft start sequence. In one example, bowed rotor starting involves rotating the compressor blades at a sub-idle speed to thermally equalize the rotor shaft before a full start. The integrated generator of ATS 110 can accomplish or aid in such bowed rotor starting. In one example, the generator is excited by airflow through ATS 110 during the aircraft start sequence, thereby resulting in a pressure drop across the rotor blades of ATS 110 and hence reducing the torque which ATS 110 drives into gearbox 116. This would result in a slower operational speed of the compressor blades, thereby allowing the rotor shafts to thermally equalize before a full start. Thereafter, a full start sequence can be performed to accomplish engine light off, as described above.

Upon the aircraft start sequence completing and the aircraft being operational, starter air valve 108 is commanded to be closed. Bleed air is bled from high pressure compressor 118 and low pressure compressor 120. Bleed air from high pressure compressor 118 is supplied to ATS 110 through high pressure valve 122 and bleed air from low pressure compressor 120 is supplied to ATS 110 through low pressure check valve 124. Low pressure check valve 124 is configured to operate inversely to high pressure valve 122. Bleed air flowing through ATS 110 excites the integrated generator. The excited integrated generator thus slows the turbine of ATS 110 thereby creating a pressure drop across the turbine and hence resulting in the pressure regulation of the bleed air within ATS 110. Pressure regulated bleed air from ATS 110 can then be routed via switching valve 112. Pressure regulated bleed air can be directed to ECS 126 within airframe 102. In the case where the bleed air is not appropriately pressure regulated, switching valve 112 can instead direct the exhaust to ambient atmosphere 114.

Pressure regulated bleed air directed to the ECS 126 can be routed through over pressure valve 106. Over pressure valve 106 can be a pressure regulating valve that is configured to close if the integrated generator within ATS 110 fails to regulate the pressure of the bleed air appropriately.

Pressure regulated bleed air directed to ECS 126 can also be routed through precooler 104. Precooler 104 can be a heat exchanger configured to cool the pressure regulated bleed air to a desired temperature for use in the ECS.

Pneumatic start system 100 provides several beneficial advantages. As described, the integrated generator within ATS 110 can be used to accomplish bowed rotor starting in the case where compressor blades need to be thermally equalized in order to begin operation without contacting the compressor case. Further, the integrated generator within ATS 110 can provide additional generator power while the engine is running to support various aircraft systems that may need such power. In one example, generators are contained within gearbox 116, and the integrated generator of ATS 110 can be electrically connected to gearbox 116 to act as a backup generator therein.

Further advantages include the fact that generator functionality is provided to a system (i.e., ATS 110) that would otherwise be dormant during aircraft operation. Thus, the net weight, space, and cost efficiency of pneumatic start system 100 is improved. Further, the generator within ATS 110 is used for pressure regulation of bleed air from high pressure compressor 118 and low pressure compressor 120, thereby relieving the need for a pressure regulation valve. Thus, again, the net weight, space, and cost efficiency of pneumatic start system 100 is improved.

Figure 2:
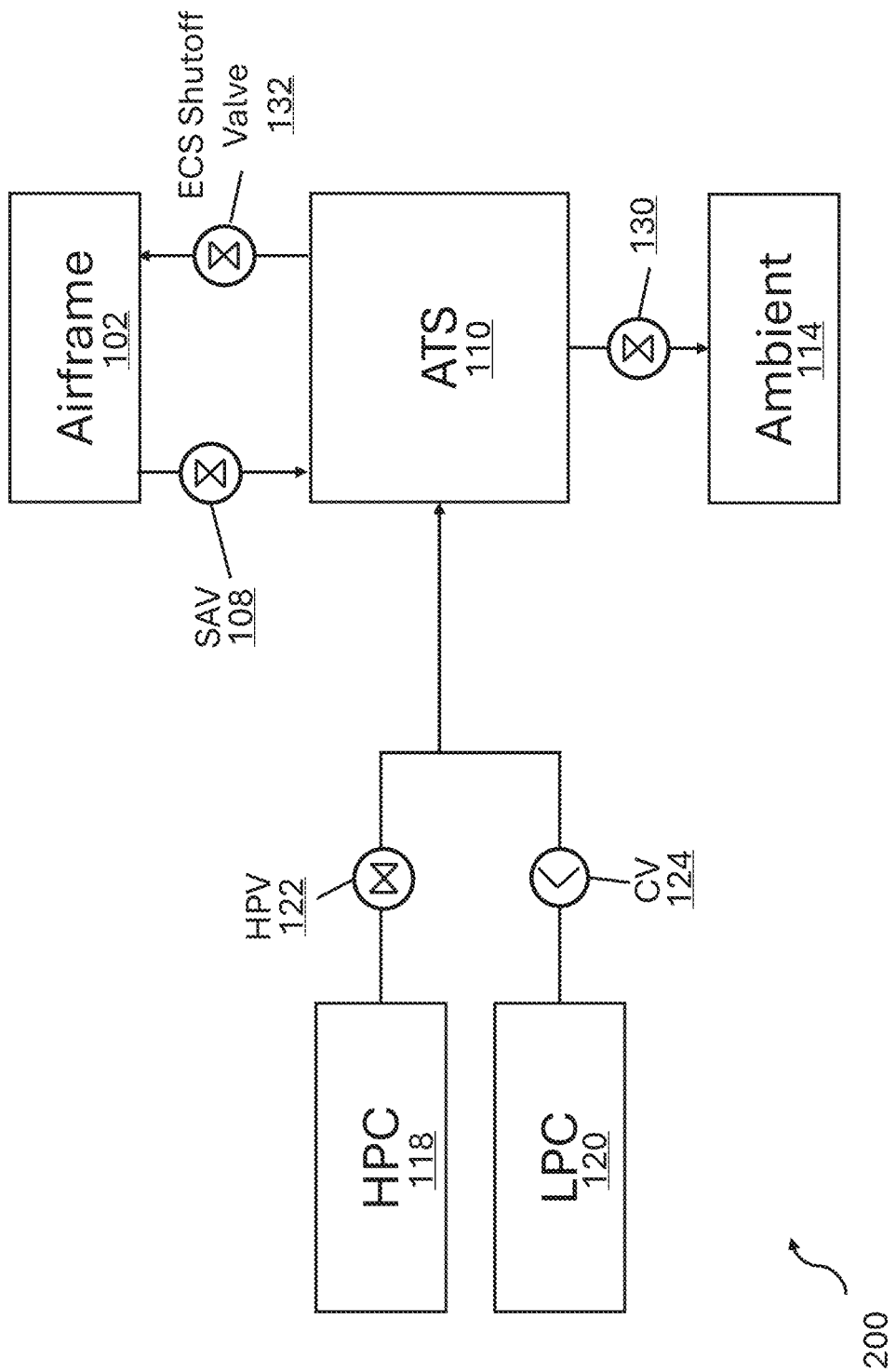
FIG. 2 is a block diagram depicting fluid flow paths from the air turbine starter.

FIG. 2 is a block diagram 200 depicting fluid flow paths from ATS 110. Block diagram 200 is a simplified view of the fluid paths of pneumatic start system 100 shown in FIG. 1. Block diagram 200 includes starter air valve 108, ATS 110, ambient atmosphere 114, high pressure compressor 118, low pressure compressor 120, high pressure valve 122, low pressure check valve 124, ambient release valve 130, and ECS shut off valve 132.

The elements of block diagram 200 operate similarly to the counterpart elements of pneumatic start system 100. The distinction between block diagram 200 and pneumatic start system 100 is the depiction of switching valve 112 within system 100 and ambient release valve 130 and ECS shutoff valve 132 within diagram 200. It is understood that switching valve 112 can comprise ambient release valve 130 and ECS shutoff valve 132 and can be configured to switch between ambient release valve 130 and ECS shutoff valve 132. Alternatively, ambient release valve 130 and ECS shut off valve 132 can be distinct valves that are not included in a switching valve. As described with respect to system 100, ambient release valve 130 can be used to exhaust air from airframe 112 that is used during the aircraft start sequence. During the start sequence, ECS shutoff valve 132 can be closed such that no air is routed to the ECS system of airframe 112. After the start sequence, ambient release valve 130 can be closed while ECS shutoff valve 132 is opened in order to allow compressor bleed air to flow to the ECS. In cases in which compressor bleed air is not regulated appropriately, ambient release valve 130 can be opened to release compressor bleed air to ambient atmosphere 114 while ECS shutoff valve 132 is closed to prevent flow to the ECS. Such an operation can be done manually or by operation of an electronic controller.

The system depicted by block diagram 200 is an additional view of system 100 and hence provides the same advantages. Additionally and more specifically, the valve configuration described allows for regulation of compressor bleed air and ensures that in cases where bleed air is not appropriately regulated, it can be released to ambient atmosphere 114.

Figure 3:
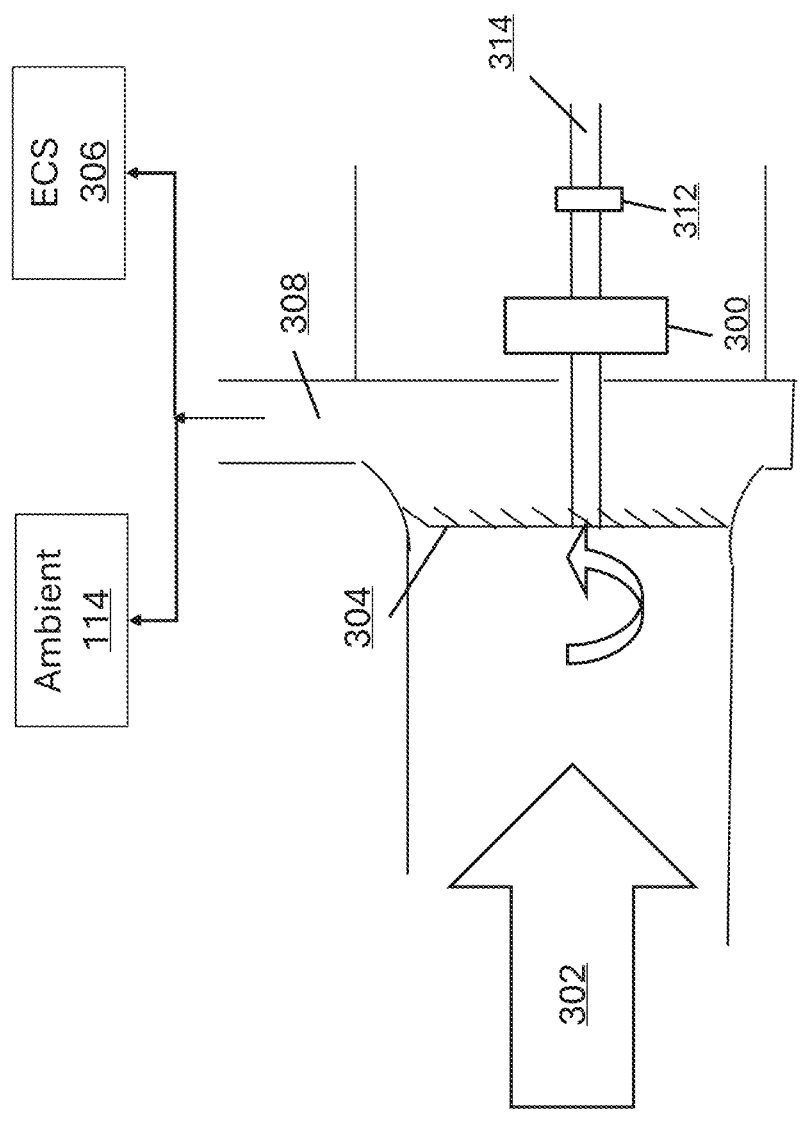
FIG. 3 is a diagram of an air turbine starter within the pneumatic start system with the integrated electric generator.

FIG. 3 is a diagram of air turbine starter (ATS) 110 within pneumatic start system 100 with the integrated electric generator 300. ATS 110 includes integrated electric generator 300, ATS inlet 302, ATS turbine 304, turbine exhaust outlet 308, spur gear 312, and turbine shaft 314. Turbine exhaust output 308 of ATS 110 is fluidly coupled to ambient atmosphere 114 and environmental control system (ECS) 306.

In operation, upon execution of an aircraft start sequence, air from an airframe enters ATS 110 via ATS inlet 302, thus providing pneumatic energy. The air can flow through a starter air valve, such as starter air valve 108 of system 100 (FIG. 1). The air provided to ATS inlet 302 turns rotors of ATS turbine 304, thus producing mechanical energy. The turning of the rotors of ATS turbine 304 results in the turning of common turbine shaft 314.

In some embodiments, integrated electric generator 300 is not clutched to common turbine shaft 314 during the aircraft start sequence and hence rotors within integrated electric generator 300 are not activated. In such an embodiment, integrated electric generator 300 is not excited during the aircraft start sequence, and common turbine shaft directly imparts mechanical energy to a gearbox via a connection to spur gear 312. In other embodiments, integrated electric generator 300 is clutched to common turbine shaft during the aircraft start sequence and hence integrated electric generator 300 is excited. Such an embodiment can be used for bowed rotor starting, wherein the rotor blades within a compressor section of an air turbine engine are bowed. As described above, the load generated by the excitement of integrated electric generator 300 during the aircraft start sequence can reduce the speed of rotation of rotor blades within the compressor section, thereby allowing for a sub-idle start speed and allowing the rotor blades to thermally equalize before reaching an appropriate speed for combustion. In either embodiment, air from starter air valve 108 is exhausted to ambient atmosphere 114 via turbine exhaust outlet 308. Starter air valve 108 can then be closed.

After the start sequence is complete, integrated electric generator 300 can be clutched to common turbine shaft 314. Compressor bleed air from the compressor section is routed to ATS 110 via ATS inlet 302. Compressor bleed air causes rotors of turbine 304 to turn. As a result, common turbine shaft 314 rotates, causing integrated electric generator 300 to become excited. The excitation of integrated electric generator 300 creates a load and hence a pressure drop across turbine 304. Thus, the pressure of the compressor bleed air is regulated by the creation of the pressure drop. Pressure regulated compressor bleed air is then routed to ECS 306 via turbine exhaust outlet 308.

As described with respect to system 100 and diagram 200, turbine exhaust outlet 308 can be connected to a switching valve or multiple separate valves. The operation of such valve(s) can determine the fluid path of the exhaust of ATS 110. In examples, where the compressor bleed air is not appropriately pressure regulated, the valve(s) can be configured such that the compressor bleed air is routed to ambient atmosphere 114. In examples where the pressure regulation function is working as desired, the valve(s) can be configured such that the compressor bleed air is routed to ECS 306.

ATS 110 provides the benefit of an additional electrical power generation source via integrated generator 300 as well as pressure regulation of compressor bleed air as accomplished by the pressure drop created by excitation of integrated electric generator 300. Further, the depiction of ATS 110 in FIG. 3 makes clear the space efficiency achieved by housing integrated electric generator 300 withing ATS 110. Additionally, operation of ATS 110 during aircraft flight provides functionality to an otherwise dormant system.

Figure 4:
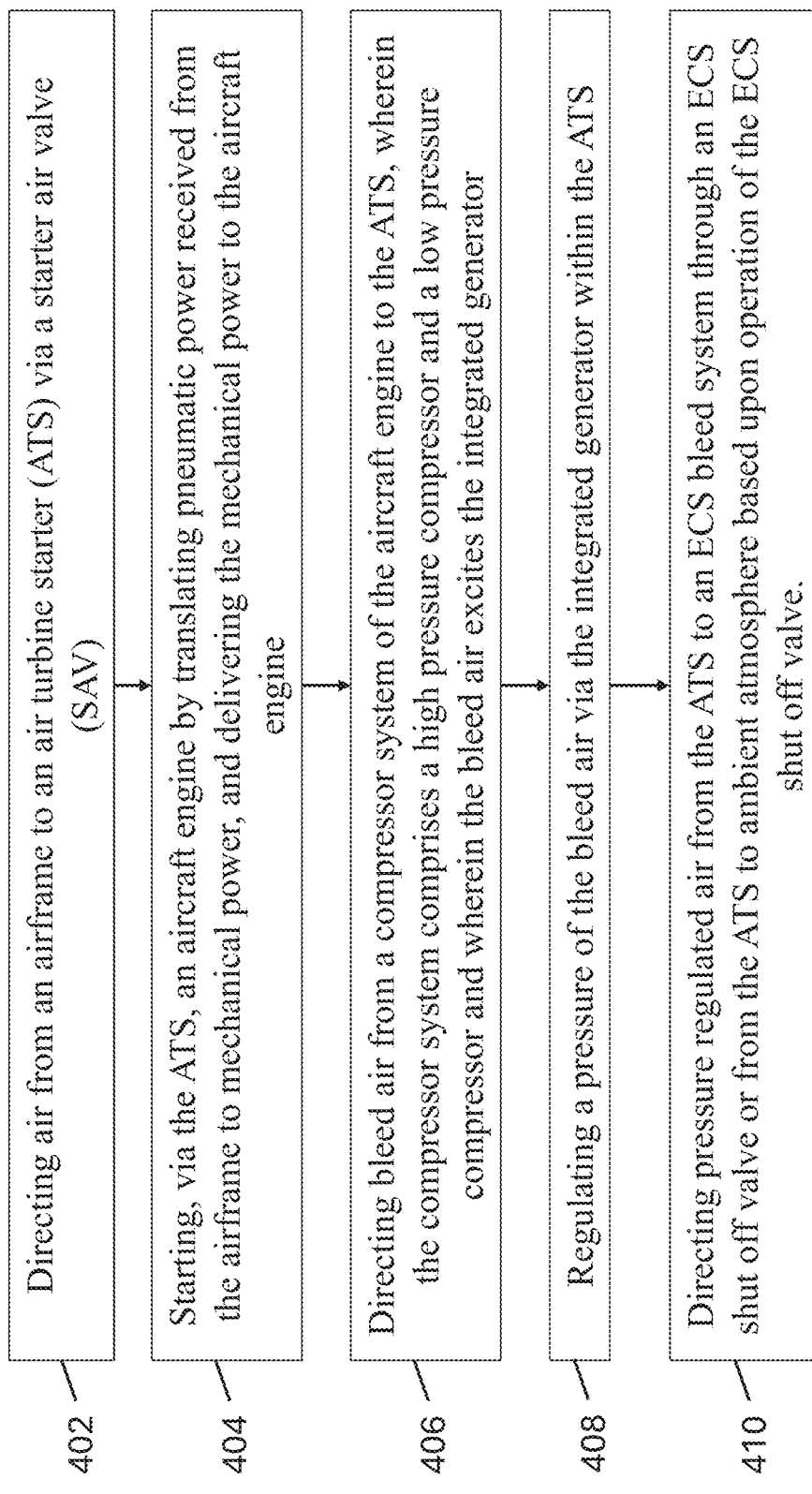
FIG. 4 is a flowchart depicting a method for implementing a pneumatic start system with an integrated electric generator.

FIG. 4 is a flowchart depicting method 400 for implementing a pneumatic start system with integrated electric generator 300 (FIG. 3). Reference will be made to the reference numerals of system 100 (FIG. 1) for clarity.

Method 400 begins at step 402 wherein air is directed to ATS 110 via starter air valve 108. Air can be routed from airframe 102 through starter air valve 108, however other sources of pneumatic energy are also contemplated by this disclosure (e.g., air from an auxiliary power unit, air from an already-running engine, air from a ground supported air compressor, etc.).

At step 404, an aircraft engine is started via ATS 110. The aircraft engine is started by translating pneumatic energy received through starter air valve 108 to mechanical power, and delivering the mechanical power to the aircraft engine. In some examples, the mechanical power is delivered via a mechanically connected gearbox to high pressure compressor 118, such that rotors within high pressure compressor 118 turn. Once the rotors within high pressure compressor 118 reach a sufficient light off speed, fuel is applied and sparking occurs within the combustor section of the aircraft engine.

At step 406, bleed air from the compressor system of the aircraft (i.e., high pressure compressor 118 and low pressure compressor 120) is directed to ATS 110. The bleed air from the compressor section excites integrated generator 300 within ATS 110.

At step 408, a pressure of the compressor bleed air is regulated within ATS 110 via work performed upon the turbine within ATS 110 to excite integrated generator 300. The pressure is regulated as the excitation of integrated generator 300 creates a pressure drop across the turbine within ATS 110.

At step 410, pressure regulated compressor bleed air is directed from ATS 110 to ECS 126 via ECS shut off valve 132. Alternatively, the compressor bleed air can be directed to ambient atmosphere 114 via ambient release valve 130 based upon operation of ECS shut off valve 132. In cases where the compressor bleed air is appropriately regulated, ECS shut off valve 132 can be open and ambient release valve 130 can be closed, thereby allowing the pressure regulated compressor bleed air to flow to ECS 126. In cases where the compressor bleed air is not appropriately regulated, ECS shut off valve 132 can be closed and ambient release valve 130 can be opened, thereby allowing the improperly regulated compressor bleed air to be released to ambient atmosphere 114. In some examples, ECS shut off valve 132 and ambient release valve 130 are contained within switching valve 112.

The techniques of this disclosure disclose a system for adding electric generator functionality to a pneumatic start system ATS. The inclusion of the electric generator allows for the ATS to pressure regulate compressor bleed air for ultimate delivery to an aircraft ECS. Further, the inclusion of the electrical generator allows for an additional source of electrical power to be contained within the aircraft. The additional source can thus be used to power various systems on board the aircraft and can otherwise or additionally be used as a backup generator source. The techniques of this disclosure provide a function to the ATS system, which would otherwise be dormant after an aircraft start sequence is complete.

Discussion of Possible Embodiments

The following are non-exclusive descriptions of possible embodiments of the present invention.

A pneumatic start system with an integrated electric generator includes a compressor system comprising a high pressure compressor and a low pressure compressor. The system further includes an air turbine starter (ATS) fluidly coupled to the compressor system, fluidly coupled to ambient atmosphere, and fluidly coupled to an environmental control system (ECS) bleed system. The ATS comprising the integrated generator. Bleed air from the compressor system flows through an inlet of the air turbine starter, thereby exciting the integrated generator. The ATS is configured to regulate a pressure of bleed air from the compressor system via operation of the integrated generator. A first fluid connection between the ECS bleed system and the ATS is regulated by a starter air valve (SAV). A second fluid connection between the ECS bleed system and the ATS is regulated by an ECS shut off valve. Pressure regulated fluid flow from the compressor system is delivered to the ECS bleed system via the second fluid connection between the ECS bleed system and the ATS or is delivered to ambient atmosphere, via a valve fluidly connected between the ATS and the ambient atmosphere, based upon operation of the ECS shut off valve.

The pneumatic start system of the preceding paragraph can optionally include, additionally and/or alternatively, any one or more of the following features, configurations and/or additional components:

A further embodiment of the foregoing pneumatic start system, further comprising a high pressure shutoff valve fluidly connected between the high pressure compressor and the ATS, wherein the high pressure shutoff valve is configured to regulate bleed air from the high pressure compressor.

A further embodiment of any of the foregoing pneumatic start systems, further comprising a low pressure check valve fluidly connected between the low pressure compressor and the ATS, wherein the low pressure check valve is configured to operate inversely to the high pressure shutoff valve.

A further embodiment of any of the foregoing pneumatic start systems, wherein the SAV is configured to open upon initiation of an aircraft turbine start sequence, thereby allowing air to flow from an airframe to the ATS.

A further embodiment of any of the foregoing pneumatic start systems, wherein exhaust exits the ATS via the valve fluidly connected between the ATS and the ambient atmosphere during the aircraft turbine start sequence.

A further embodiment of any of the foregoing pneumatic start systems, wherein the SAV is configured to close upon the high pressure compressor reaching a light off speed during the aircraft turbine start sequence.

A further embodiment of any of the foregoing pneumatic start systems, wherein the valve fluidly connected between the ATS and the ambient atmosphere and the ECS shut off valve between the ATS and the ECS bleed system are implemented in a single switching valve.

A further embodiment of any of the foregoing pneumatic start systems, wherein the single switching valve is configured to direct fluid flow from the ATS to ambient atmosphere and close a path from the ATS to the ECS bleed system in response to a detected failure in pressure regulation.

A further embodiment of any of the foregoing pneumatic start systems, wherein the single switching valve is configured to direct fluid flow from the ATS to ambient atmosphere and close a path from the ATS to the ECS bleed system in response to a detected failure in pressure regulation.

A further embodiment of any of the foregoing pneumatic start systems, further comprising an engine gearbox mechanically connected between the ATS and the high pressure compressor, wherein the engine gearbox is configured to translate mechanical power from the ATS to the high pressure compressor.

A further embodiment of any of the foregoing pneumatic start systems, wherein the integrated generator is electrically connected to the engine gearbox such that the integrated generator is a backup generator to one or more additional generators housed within the engine gearbox.

A further embodiment of any of the foregoing pneumatic start systems, further comprising an over pressurization valve connected between the ECS shut off valve and the ECS bleed system, wherein the over pressurization valve is configured to close upon the ATS failing to regulate the pressure of fluid flow from the high pressure compressor and/or fluid flow from the low pressure compressor.

A further embodiment of any of the foregoing pneumatic start systems, further comprising a precooler channel connected between the over pressurization valve and the ECS bleed system wherein the precooler channel is configured to cool bleed air from the compressor system.

A method of operating a pneumatic start system of an aircraft with an integrated electric generator, wherein the pneumatic start system comprises a compressor system and an air turbine starter (ATS) fluidly coupled to the compressor system, fluidly coupled to ambient atmosphere, and fluidly coupled to an environmental control system (ECS) bleed system, the method comprising includes directing air from an airframe of the aircraft to an air turbine starter (ATS) via a starter air valve (SAV). The method further includes starting, via the ATS, an aircraft engine by translating pneumatic power received from the airframe to mechanical power, and delivering the mechanical power to the aircraft engine. The method further includes directing bleed air from the compressor system of the aircraft engine to the ATS, wherein the bleed air excites the integrated generator. The method further includes regulating a pressure of the bleed air via the integrated generator within the ATS. The method further includes directing pressure regulated air from the ATS to an ECS bleed system through an ECS shut off valve or from the ATS to ambient atmosphere based upon operation of the ECS shut off valve.

A further embodiment of the foregoing method, further comprising directing bleed air from the high pressure compressor through a high pressure shutoff valve fluidly connected between the high pressure compressor and the ATS, wherein the high pressure shutoff valve is configured to regulate bleed air from the high pressure compressor.

A further embodiment of any of the foregoing methods, further comprising directing engine bleed air from the low pressure compressor to the ATS through a low pressure check valve fluidly connected between the low pressure compressor and the ATS, wherein the low pressure check valve is configured to operate inversely to the high pressure shutoff valve.

A further embodiment of any of the foregoing methods, wherein the SAV is configured to open upon initiation of an aircraft turbine start sequence, thereby allowing air to flow from an airframe to the ATS.

A further embodiment of any of the foregoing methods, wherein exhaust exits the ATS via the connection between the ATS and the ambient atmosphere during the aircraft turbine start sequence.

A further embodiment of any of the foregoing methods, further comprising closing the SAV upon the high pressure compressor reaching a light off speed during the aircraft turbine start sequence.

A further embodiment of any of the foregoing methods, further comprising directing pressure regulated air from the ATS to ambient atmosphere based upon operation of the ECS shut off valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pneumatic start system with an integrated generator for an aircraft, the system comprising:
 a compressor system, the compressor system comprising a high pressure compressor and a low pressure compressor;
 an air turbine starter (ATS) fluidly coupled to the compressor system, and fluidly coupled to ambient atmosphere and an environmental control system (ECS) bleed system in parallel, the ATS comprising the integrated generator, wherein:
  bleed air from the compressor system is configured to flow through an inlet of the air turbine starter, thereby exciting the integrated generator;
  the ATS is configured to regulate a pressure of the bleed air from the compressor system via operation of the integrated generator;
  a first fluid connection between the ECS bleed system and the ATS is regulated by a starter air valve (SAV);
  a second fluid connection between the ECS bleed system and the ATS is regulated by an ECS shut off valve;
  pressure regulated fluid flow from the compressor system is configured to deliver pressure regulated fluid flow to the ECS bleed system via the second fluid connection between the ECS bleed system and the ATS based upon operation of the ECS shut off valve; and
  the ambient release valve and the ECS shut off valve are implemented in a single switching valve configured to direct fluid flow from the ATS to ambient atmosphere and to close a path from the ATS to the ECS bleed system in response to a detected failure in pressure regulation.

2. The system of claim 1, further comprising a high pressure shutoff valve fluidly connected between the high pressure compressor and the ATS, wherein the high pressure shutoff valve is configured to regulate bleed air from the high pressure compressor.

3. The system of claim 2, further comprising a low pressure check valve fluidly connected between the low pressure compressor and the ATS, wherein the low pressure check valve is configured to operate inversely to the high pressure shutoff valve.

4. The system of claim 1, wherein the SAV is configured to open upon initiation of an aircraft turbine start sequence, thereby allowing air to flow from an airframe to the ATS.

5. The system of claim 4, wherein exhaust exits the ATS via an ambient release valve fluidly connected between the ATS and the ambient atmosphere during the aircraft turbine start sequence.

6. The system of claim 4, wherein the SAV is configured to close upon the high pressure compressor reaching a light off speed during the aircraft turbine start sequence.

7. The system of claim 1, wherein an ambient release valve fluidly connected between the ATS and the ambient atmosphere and the ECS shut off valve between the ATS and the ECS bleed system are implemented in a single switching valve.

8. The system of claim 7, wherein the pressure regulated fluid flow from the compressor system is delivered to ambient atmosphere, via a valve fluidly connected between the ATS and the ambient atmosphere, based upon operation of the single switching valve.

9. The system of claim 1, further comprising an engine gearbox mechanically connected between the ATS and the high pressure compressor, wherein the engine gearbox is configured to translate mechanical power from the ATS to the high pressure compressor.

10. The system of claim 9, wherein the integrated generator is electrically connected to the engine gearbox such that the integrated generator is a backup generator to one or more additional generators housed within the engine gearbox.

11. The system of claim 1, further comprising an over pressurization valve connected between the ECS shut off valve and the ECS bleed system, wherein the over pressurization valve is configured to close upon the ATS failing to regulate the pressure of fluid flow from the high pressure compressor and/or fluid flow from the low pressure compressor.

12. The system of claim 11, further comprising a precooler channel connected between the over pressurization valve and the ECS bleed system, wherein the precooler channel is configured to cool bleed air from the compressor system.

13. A method of operating a pneumatic start system of an aircraft with an integrated electric generator, wherein the pneumatic start system comprises a compressor system and an air turbine starter (ATS) fluidly coupled to the compressor system, fluidly coupled to ambient atmosphere and to an environmental control system (ECS) bleed system in parallel, the method comprising:
 directing air from an airframe of the aircraft to the ATS via a starter air valve (SAV);
 starting, via the ATS, an aircraft engine by translating pneumatic power received from the airframe to mechanical power, and delivering the mechanical power to the aircraft engine;
 directing bleed air from the compressor system of the aircraft engine to the ATS, wherein the bleed air excites the integrated generator;
 regulating a pressure of the bleed air via the integrated generator within the ATS; and
 directing pressure regulated air from the ATS to an ECS bleed system through an ECS shut off valve between the ATS and the ECS bleed system; and
 directing air from the ATS to the ambient atmosphere via an ambient release valve fluidly connected between the ATS and the ambient atmosphere, wherein the ambient release valve and the ECS shut off valve are implemented in a single switching valve configured to direct fluid flow from the ATS to ambient atmosphere and close a path from the ATS to the ECS bleed system in response to a detected failure in pressure regulation.

14. The method of claim 13, further comprising directing bleed air from a high pressure compressor of the compressor system through a high pressure shutoff valve fluidly connected between the high pressure compressor and the ATS, wherein the high pressure shutoff valve is configured to regulate bleed air from the high pressure compressor.

15. The method of claim 14, further comprising directing engine bleed air from a low pressure compressor of the compressor system to the ATS through a low pressure check valve fluidly connected between the low pressure compressor and the ATS, wherein the low pressure check valve is configured to operate inversely to the high pressure shutoff valve.

16. The method of claim 15, wherein the SAV is configured to open upon initiation of an aircraft turbine start sequence, thereby allowing air to flow from an airframe to the ATS.

17. The method of claim 16, wherein exhaust exits the ATS via the connection between the ATS and the ambient atmosphere during the aircraft turbine start sequence.

18. The method of claim 16, further comprising closing the SAV upon the high pressure compressor reaching a light off speed during the aircraft turbine start sequence.

19. The method of claim 13, further comprising directing pressure regulated air from the ATS to ambient atmosphere based upon operation of the ECS shut off valve.

* * * * *